United States Patent
Kim et al.

(10) Patent No.: US 11,051,042 B2
(45) Date of Patent: Jun. 29, 2021

(54) IMAGE PROCESSING DEVICE AND METHOD

(71) Applicant: SAMSUNG ELECTRONICS CO., LTD., Suwon-si (KR)

(72) Inventors: Sung-Oh Kim, Suwon-si (KR); Hyun-Hee Park, Seoul (KR); Kwang-Young Kim, Yongin-si (KR); Yong-Man Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 553 days.

(21) Appl. No.: 15/743,376

(22) PCT Filed: Aug. 24, 2016

(86) PCT No.: PCT/KR2016/009356
§ 371 (c)(1),
(2) Date: Jan. 10, 2018

(87) PCT Pub. No.: WO2017/034311
PCT Pub. Date: Mar. 2, 2017

(65) Prior Publication Data
US 2018/0205967 A1     Jul. 19, 2018

(30) Foreign Application Priority Data
Aug. 24, 2015   (KR) .......................... 10-2015-0118696

(51) Int. Cl.
*H04N 19/80*     (2014.01)
*H04N 19/176*    (2014.01)
(Continued)

(52) U.S. Cl.
CPC ........... *H04N 19/80* (2014.11); *H04N 19/103* (2014.11); *H04N 19/117* (2014.11);
(Continued)

(58) Field of Classification Search
None
See application file for complete search history.

(56) References Cited

U.S. PATENT DOCUMENTS

2006/0176957 A1    8/2006   Han et al.
2008/0050023 A1*   2/2008   Feng ............... H04N 19/46
                                                    382/232

(Continued)

FOREIGN PATENT DOCUMENTS

JP    2004-350158     12/2004
KR    10-2006-0090141  8/2006

OTHER PUBLICATIONS

Jeon, Jun Hyun et al., "Progressive Video Coding Using Hierarchical Edge-Based Motion Estimation at Low Bit Rates", Journal of the Institute of Electronics and Information Engineers Conference 6(1), pp. 92-95, Jan. 1993 (Year: 1993).*

(Continued)

*Primary Examiner* — James M Anderson, II
(74) *Attorney, Agent, or Firm* — Nixon & Vanderhye, P.C.

(57) ABSTRACT

Various embodiments of the present disclosure relate to an image processing device and method for compressing and restoring an image. To this end, edged information and scaling information are obtained from an input signal, and block information employed for obtaining the edged information and the scaling information is generated. In addition, encoding information is transmitted according to a preset transmission format so as to include the edged information, the scaling information, and the block information.

14 Claims, 13 Drawing Sheets

(51) Int. Cl.
*H04N 19/14* (2014.01)
*H04N 19/146* (2014.01)
*H04N 19/103* (2014.01)
*H04N 19/59* (2014.01)
*H04N 19/46* (2014.01)
*H04N 19/132* (2014.01)
*H04N 19/117* (2014.01)
*H04N 19/124* (2014.01)

(52) U.S. Cl.
CPC ......... *H04N 19/124* (2014.11); *H04N 19/132* (2014.11); *H04N 19/14* (2014.11); *H04N 19/146* (2014.11); *H04N 19/176* (2014.11); *H04N 19/46* (2014.11); *H04N 19/59* (2014.11)

(56) References Cited

U.S. PATENT DOCUMENTS

2012/0183056 A1  7/2012  He et al.
2012/0294369 A1  11/2012  Bhagavathy et al.

OTHER PUBLICATIONS

International Search Report of PCT/KR2016/009356, dated Nov. 25, 2016, 5 pages.
Written Opinion of the ISA PCT/KR2016/009356, dated Nov. 25, 2016, 6 pages.
Jeon et al. "Progressive Video Coding Using Hierarchical Edge-Based Motion Estimation at Low Bit Rates", Journal of the Institute of Electronics and Information Engineers Conference 6 (1), Jan. 1993, 6 pages.

* cited by examiner

IMAGE PROCESSING DEVICE AND METHOD

CROSS-REFERENCE TO RELATED APPLICATION(S)

The present application claims priority under 35 U.S.C. § 365 to International Patent Application No. PCT/KR2016/009356 filed on Aug. 24, 2016, entitled "IMAGE PROCESSING DEVICE AND METHOD", and to Korean Patent Application No. 10-2015-0118696 filed on Aug. 24, 2015, which are incorporated herein by reference into the present disclosure as if fully set forth herein.

TECHNICAL FIELD

Various embodiments of the present disclosure relate to an image processing device and a method for compressing and reconstructing an image.

BACKGROUND ART

For recent broadcast services, a video communication service achieved through convergence between a broadcast service and a communication service has been generalized. The video communication service is based on a broadband network for providing high-speed information transfer, as well as a terminal which can quickly process information.

A terminal supporting the video communication service consumes a lot of power due to image processing. Especially, the resolution of an image to be processed may be a key factor that determines the power consumption of the terminal while the image is being displayed. For example, the power consumption by a terminal that can be carried (hereinafter, referred to as a "portable terminal") during displaying may increase in proportion to the resolution of an image to be processed.

The increase in resolution of an image to be processed increases a bandwidth on a link to transfer information on the image. For example, within one device, a bandwidth for transferring a frame by an Application Processor (AP) to a display device increases proportionally to a display resolution. In another example, when one device transfers multimedia data to another device in a wireless network, a bandwidth to be used in the wireless network may increase in proportion to the size of the multimedia data to be transferred.

For these reasons, most electronic devices for processing information use various encoding (compressing) and decoding (hereinafter, referred to as "decompressing (reconstructing)") technologies to reduce the amount of information. The encoding (compressing) and decoding (reconstructing) technologies enables the capacity of a recording medium to be effectively used, and additionally enables information to be easily transferred.

Generally, the quality of a compressed image may be determined by a type of a compression mode used for compressing a data block. For example, a data block may be compressed by using a compression method expected to cause a minimum compression error. Therefore, development and research are being conducted to obtain a high image quality, by selecting a compression mode expected to cause a minimum compression error and compressing a data block by using the selected compression mode.

SUMMARY

An embodiment of the present disclosure may provide a device and method in which an image processing device reuses correlation information to compress image data.

An embodiment of the present disclosure may provide a device and method in which an image processing device determines a compression rate on edged information and scaling information by using block information.

An embodiment of the present disclosure may provide a device and method in which an image processing device determines a mode for compressing image data in consideration of whether an image to be compressed includes an edge.

An embodiment of the present disclosure may provide a device and method in which an image processing device compresses and reconstructs image data on the basis of a hierarchical structure.

A device according to various embodiments of the present disclosure may include: an encoding module that obtains edged information and scaling information from an input signal and generates block information employed for obtaining the edged information and the scaling information; and a transmission module that transmits encoding information according to a predetermined transmission format by which the encoding information includes the edged information, the scaling information, and the block information.

A method according to various embodiments of the present disclosure may include: obtaining edged information and scaling information from an input signal; generating block information employed for obtaining the edged information and the scaling information; and transmitting encoding information according to a predetermined transmission format by which the encoding information includes the edged information, the scaling information, and the block information.

According to various embodiments, motion estimation may be omitted for an image including no edge, so as to reduce the quantity of calculations for the motion estimation. Furthermore, a motion estimation error according to brightness information change and a motion estimation error, which may occur when there is no a reference image, for example, in a motion vector falling outside of a search range or during a scene change, can be reduced.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF EXAMPLE EMBODIMENT

Figure 1:
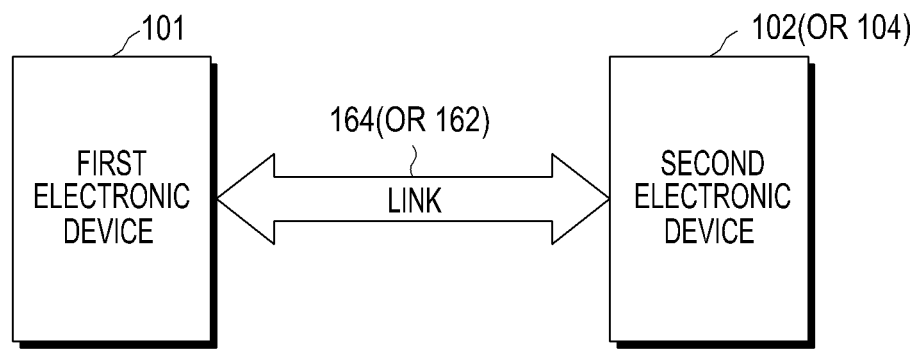
FIG. 1 is a diagram conceptually illustrating a relationship between electronic devices that performs compression and reconstruction, according to various embodiments.

Hereinafter, various embodiments of the present disclosure will be described with reference to the accompanying drawings. However, it should be understood that there is no intent to limit the present disclosure to particular forms, and the present disclosure should be construed to cover all modifications, equivalents, and/or alternatives falling within the spirit and scope of the embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various constituent elements regardless of the order and/or the importance thereof, but does not limit the corresponding constituent elements. The above-described expressions may be used to distinguish a constituent element from another constituent element. For example, a first user device and a second user device indicate different user devices regardless of the order and/or the importance thereof, although both of them are user devices. For example, a first constituent element may be termed a second constituent element, and similarly, a second constituent element may be termed a first constituent element without departing from the scope of the present disclosure.

It should be understood that when an constituent element (e.g., a first constituent element) is referred to as being (operatively or communicatively) "connected," or "coupled," to another constituent element (e.g., second constituent element), it may be directly connected or coupled directly to the other constituent element, or any other constituent element (e.g., a third constituent element) may be interposed between them. In contrast, it may be understood that when a constituent element (e.g., a first constituent element) is referred to as being "directly connected," or "directly coupled" to another constituent element (e.g., second constituent element), there is no constituent element (e.g., a third constituent element) interposed therebetween.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the scope of other embodiments. A singular expression may include a plural expression unless they are definitely different in context. Unless defined otherwise, all terms used herein, including technical terms and scientific terms, may have the same meaning as commonly understood by a person of ordinary skill in the art to which the present disclosure pertains. Terms, such as those defined in commonly used dictionaries, should be interpreted as having a meaning that is the same or similar to their meaning in the context of the relevant art, and are not to be interpreted in an idealized or overly formal sense unless expressly so defined herein. In some cases, even the term defined in the present disclosure should not be interpreted to exclude embodiments of the present disclosure.

For example, the electronic device according to various embodiments of the present disclosure may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MP3 player, a mobile medical appliance, a camera, and a wearable device (e.g., smart glasses, a head-mounted-device (HMD), electronic clothes, an electronic bracelet, an electronic necklace, an electronic appcessory, electronic tattoos, a smart mirror, or a smart watch).

According to some embodiments, the electronic device may be a smart home appliance. The smart home appliance may include at least one of, for example, a television, a Digital Video Disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA) device, a Magnetic Resonance Imaging (MRI) device, a Computed Tomography (CT) machine, a tomograph, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in a bank, a Point Of Sales (POS) terminal in a shop, or an Internet Of Things device (e.g., a light bulb, various sensors, an electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

FIG. 1 is a diagram conceptually illustrating a relationship between electronic devices that performs compression and reconstruction, according to various embodiments.

Referring to FIG. 1, a first electronic device 101 and a second electronic device 102 (or 104) are connected to each other by a predetermined link 164 (or 162). As an example, when the first electronic device 101 provides a function of compressing image data, the second electronic device 102 (or 104) may provide a function of reconstructing the compressed image data. In contrast, when the second electronic device 102 (or 104) provides a function of compressing image data, the first electronic device 101 (or 104) may provide a function of reconstructing the compressed image data.

Hereinafter, for convenience of explanation, it will be assumed that the first electronic device 101 provides a function of compressing image data and that the second electronic device 102 (or 104) provides a function of reconstructing the compressed image data. In this case, image data compressed by the first electronic device 101 may be transferred to the second electronic device 102 (or 104) through a link 164 (or 162).

When the compressed image data is transferred, a transmission ability of the link 164 (or 162) may be affected by a compression performance of the first electronic device 101. That is, when a compression performance of the first electronic device 101 is excellent, it is possible to reduce consumption resources (bandwidth, etc.) in the link 164 (or 162), for transferring the compressed image data to the second electronic device 102 (or 104).

For example, the compression performance may be defined by a compression rate. The compression rate may be defined as a ratio between the size of image data before compression and the size of image data after compression. For example, in order to perform terrestrial transmission of thirty frames, each frame having a size of 8K, at a speed of 11.4 Gbps and using a bandwidth of 17 Mbps, compression of about 670 times or more may be needed. Provision of the compression performance may be difficult to obtain using H.264 which has a compression rate of about 50 times, HEVC which has a compression rate of about 100 times, or the like among previously known compression schemes.

To this end, in one method, image data is down-sampled (or down-scaled) to ¼ and is then compressed, after which the compressed image data may be transmitted. In this case, metadata for image quality improvement of super resolution is extracted, the extracted metadata is compressed, and then the compressed extracted metadata may be transmitted therewith. For example, an MPEG Media Transport (MMT) format may be used as a format for transmitting the metadata.

In this case, during reconstructing, the compressed image data is reconstructed, and is then up-sampled (or up-scaled), and the compressed metadata is reconstructed and is then inserted in the up-sampled image data, so that a desired image data may be obtained.

In one proposed embodiment, a method of compressing image data by using an Edged Block Scaling (EBS) format and transmitting the compressed image data may be proposed.

Figure 2:
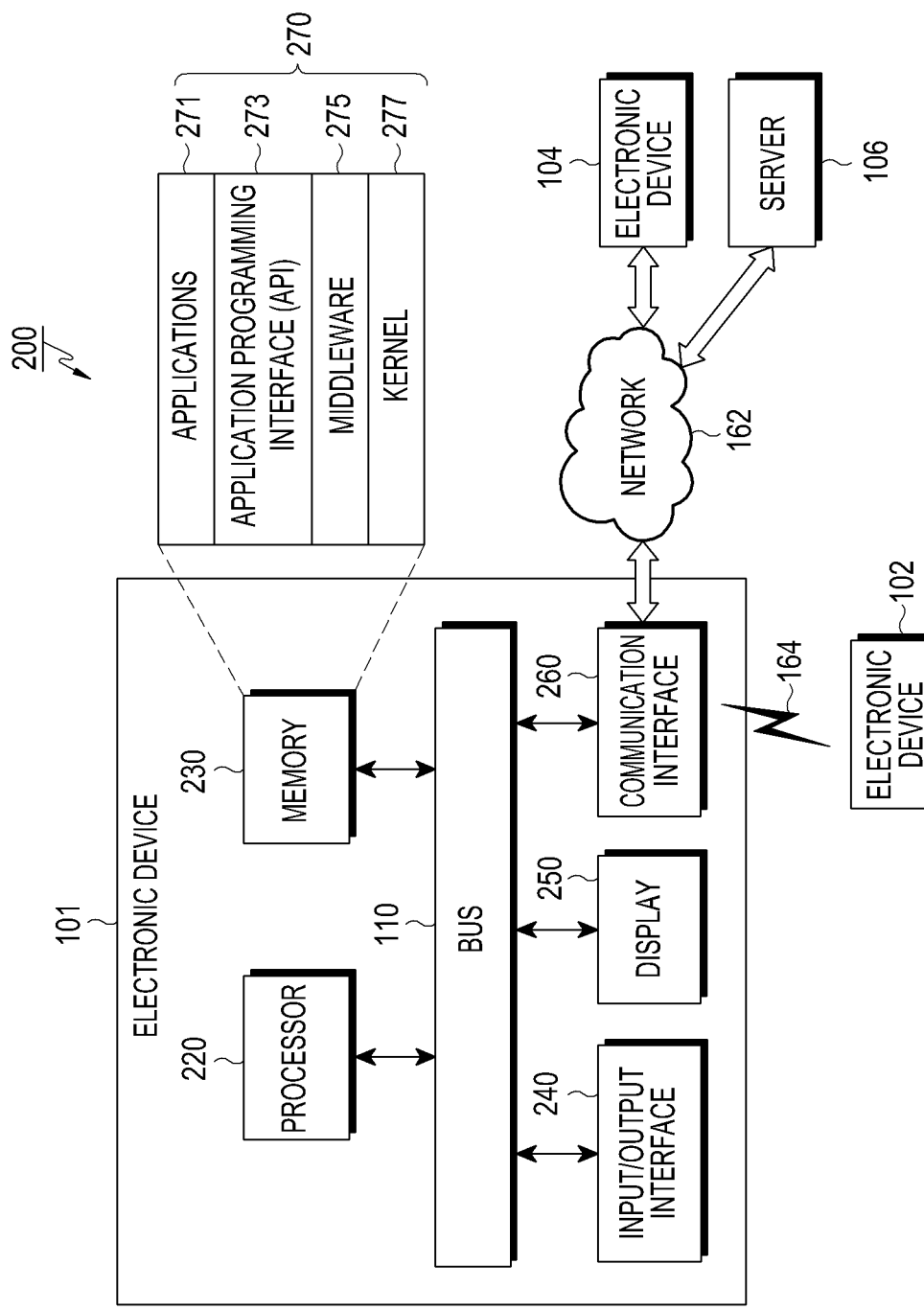
FIG. 2 is a diagram illustrating an example of an electronic device in a network environment, according to various embodiments.

FIG. 2 is a diagram illustrating an example of an electronic device in a network environment, according to various embodiments.

Referring to FIG. 2, disclosed is an electronic device 101 in a network environment 200 in various embodiments. The electronic device 101 may include a bus 210, a processor 220, a memory 230, an input/output interface 240, a display 250, and a communication interface 260. In an embodiment, at least one of the constituent elements of the electronic device 101 may be omitted, or other constituent elements may be additionally included in the electronic device 101.

The bus 210 may include, for example, a circuit that interconnects the constituent elements 210 to 260 and transfers communication (e.g., a control message and/or data) between the constituent elements.

The processor 220 may include one or more of a central processing unit (CPU), an application processor (AP), and a communication processor (CP). The processor 220 may perform, for example, calculations or data processing on control and/or communication of at least one other constituent element of the electronic device 101.

According to an embodiment, the processor 220 may perform a process for compression of image data or reconstruction of the compressed image data. For example, when the processor 220 includes one AP and one image processor, the AP may compress image data and provide the compressed image data to the image processor. In this case, the image processor may reconstruct the compressed image data and then display the reconstructed image data. For example, when the processor 220 includes one AP and one image processor, the AP may provide image data which is not compressed to the image processor. In this case, the image processor may compress the image data provided from the AP and may reconstruct the compressed image data in order to display the data.

The memory 230 may include a volatile memory and/or a nonvolatile memory. The memory 230 may store, for example, commands or data relating to at least one other constituent element of the electronic device 101. According to an embodiment, the memory 230 may store software and/or a program 270. The program 270 may include, for example, an application program (or "applications") 271, an Application Programming Interface (API) 273, a middleware 275, a kernel 277, and/or the like. At least a part of the API 273, the middleware 275, or the kernel 277 may be referred to as an Operating System (OS).

The API 273 may be, for example, an interface for controlling, by the applications 271, a function provided from the kernel 277 or the middleware 275, and may include, for example, at least one interface or function (e.g., command) for file control, window control, image processing, character control, or the like.

The middleware 275 may, for example, perform an intermediary role so that the API 273 or the applications 271 may exchange data with the kernel 277 by communicating with the kernel 277. Further, with respect to work requests received from the applications 271, the middleware 275 may, for example, perform control (e.g., scheduling or load balancing) for the work requests by using a method of assigning a priority capable of using system resources (e.g., the bus 210, the processor 220, the memory 230 or the like) of the electronic device 101 to at least one of the applications 271.

The kernel 277 may, for example, control or manage the system resources (e.g., the bus 210, the processor 220, the memory 230 or the like) that are used to execute the operation or function implemented in other programs (e.g., the middleware 275, the API 273, the applications 271 or the like). Further, the kernel 277 may provide an interface by which the applications 271, the API 273, or the middleware 275 can control or manage system resources by accessing the individual constituent elements of the electronic device 101.

The input/output interface 240 may, for example, serve as an interface that can transfer commands or data input from a user or another external device to the other constituent element(s) of the electronic device 101. Furthermore, the input/output interface 240 may output commands or data received from the other constituent element(s) of the electronic device 101 to the user or the other external device.

The display 250 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 250 may, for example, display various types of content (e.g., text, images, videos, icons, symbols, or the like) to the user. The display 250 may include a touch screen, and may receive, for example, a touch input, a gesture input, a proximity input, or a hovering input using an electronic pen or the user's body part.

The communication interface 260 may, for example, configure communication between the electronic device 101 and an external device (e.g., a first external electronic device 102, a second external electronic device 104, or a server 106). For example, the communication interface 260 is connected to a network 162 through wireless or wired communication to communicate with the external device (e.g., the second external electronic device 104 or the server 106).

For example, the wireless communication may use at least one of, for example, LTE, LTE-A, CDMA, WCDMA, UMTS, WiBro, and GSM as a cellular communication protocol. The wired communication may include at least one of, for example, a Universal Serial Bus (USB), a High Definition Multimedia Interface (HDMI), Recommended Standard 232 (RS-232), and a Plain Old Telephone Service (POTS). The network 162 may include at least one of communication networks such as a computer network (e.g., a LAN or a WAN), the Internet, and a telephone network.

Each of the first and second external electronic devices 102 and 104 may be a device which is the same as or different from the electronic device 101. The server 106 may include a group of one or more servers. All or some of the operations performed by the electronic device 101 may be performed by another electronic device or a plurality of electronic devices (e.g., the electronic device 102 or 104 or the server 106).

In case where the electronic device 101 should perform some functions or services automatically or in response to a request, the electronic device 101 may forward a request for at least some of functions associated with the functions or the services, to other electronic devices (e.g., the electronic device 102 or 104 or the server 106), instead of or in addition to autonomously executing the functions or the services. The other electronic device (e.g., the electronic device 102 or 104, or the server 106) may carry out the requested functions or the additional functions and transfer the result, obtained by carrying out the functions, to the electronic device 101. The electronic device 101 may provide the requested functions or services based on the received result as it is or after additionally processing the received result. To this end, for example, cloud computing, distributed computing, or client-server computing technology may be used.

According to an embodiment, the electronic device 101 may compress image data according to a hierarchical (hierarchy) structure, and may provide hierarchy-specific information according to the compression to another electronic device (e.g., the electronic device 102 or 104 or the server 106) by using a preconfigured format.

The hierarchical structure may include an edged layer, a block layer, and a scaling layer.

The edged layer may extract edged information of an image to be compressed, and may compress the extracted edged information. The edged layer may transfer, to the scaling layer, mode information, block size information, and the like, which are used in relation to the edged information during the compressing.

When the block layer divides an image to be compressed into a predetermined block unit, the block layer may generate information (hereinafter, referred to as "block information") on an image of a block unit according to the division. The block information may include information on the brightness, the structure (texture), the complexity, etc. of an image. The block information may be generated by using at least one of pieces of information which are used in relation to the edged information during the compressing and the scaling information during the compressing.

The scaling layer obtains scaling information from an image to be compressed, and compresses the obtained scaling information. The scaling layer may use mode information, block size information, and the like, transferred from the edged layer, during the obtaining and the compressing of the scaling information.

Figure 3:
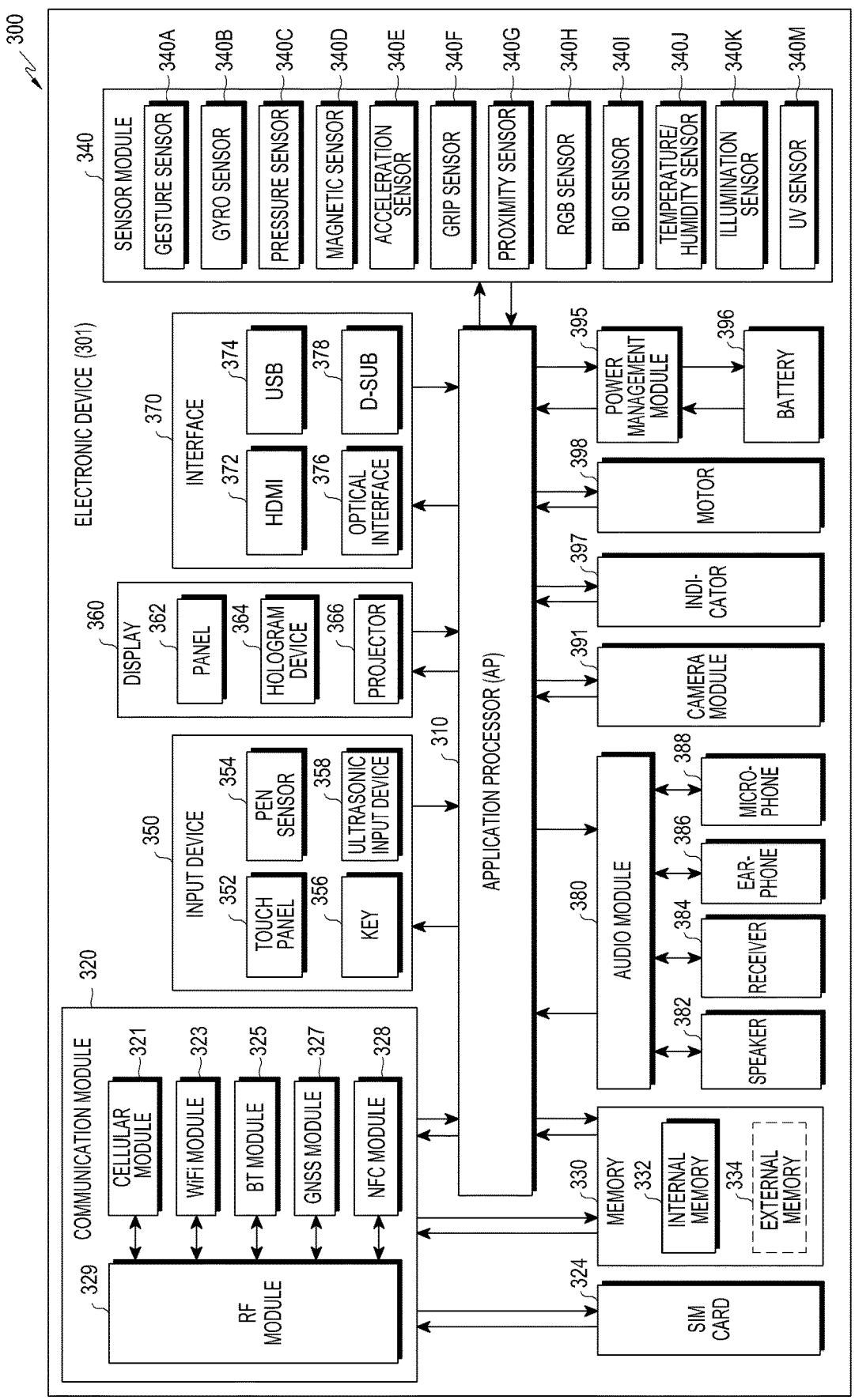
FIG. 3 is a diagram illustrating a block configuration of an electronic device, according to various embodiments.

FIG. 3 is a diagram illustrating a block configuration of an electronic device 301, according to various embodiments.

Referring to FIG. 3, the electronic device 301 may, for example, include a part or the entirety of the electronic device 301 shown in FIG. 2. The electronic device 301 may include one or more of a processor 310, a communication module 320, a subscriber identification module (SIM) card 324, a memory 330, a sensor module 340, an input device 350, a display 360, an interface 370, an audio module 380, a camera module 391, a power management module 395, a battery 396, an indicator 397, a motor 398, and the like.

The processor 310 may, for example, control a plurality of hardware or software constituent elements connected thereto and perform a variety of data processing and calculations by driving an operating system or application programs. The processor 310 may be implemented as, for example, a System on Chip (SoC). According to an embodiment, the processor 310 may be an Application Processor (AP). In this case, the processor 310 may further include a Graphic Processing Unit (GPU) and/or an image signal processor. The processor 310 may include at least some (e.g., a cellular module 321) of the constituent elements illustrated in FIG. 3. The processor 310 may load commands or data, received from at least one of other constituent elements (e.g., a nonvolatile memory), in a volatile memory to process the loaded commands or data, and may store various types of data in the nonvolatile memory.

The communication module 320 may have a configuration that is the same as or similar to that of the communication interface 260 of FIG. 2. The communication module 320 may include, for example, a cellular module 321, a Wi-Fi module 323, a BT module 325, a GPS module 327, an NFC module 328, and a Radio Frequency (RF) module 329.

The cellular module 321 may provide, for example, a voice call, a video call, a text message service, or an Internet service through a communication network. According to an embodiment, the cellular module 321 may distinguish and authenticate the electronic device 301 in the communication network by using a subscriber identification module (e.g., the SIM card 324). According to an embodiment, the cellular module 321 may perform at least some of the functions that the processor 310 may provide. According to an embodiment, the cellular module 321 may include a Communication Processor (CP).

Each of the Wi-Fi module 323, the BT module 325, the GPS module 327, and the NFC module 328 may include, for example, a processor for processing data transmitted/received through a corresponding module. According to an embodiment, at least some (e.g., two or more) of the cellular module 321, the Wi-Fi module 323, the BT module 325, the GPS module 327, and the NFC module 328 may be included in a single Integrated Chip (IC) or IC package.

The RF module 329 may, for example, transmit/receive a communication signal (for example, an RF signal). The RF module 329 may include, for example, a transceiver, a power amp module (PAM), a frequency filter, a low noise amplifier (LNA), or an antenna. According to another embodiment, at least one of the cellular module 321, the Wi-Fi module 323, the BT module 325, the GPS module 327, and the NFC module 328 may transmit/receive an RF signal through a separate RF module.

The SIM card 324 may include, for example, a card including a subscriber identification module and/or an embedded SIM, and may include unique identification information (for example, an Integrated Circuit Card Identifier (ICCID)) or subscriber information (for example, International Mobile Subscriber Identity (IMSI)).

The memory 330 (e.g., the memory 330) may, for example, include an internal memory 332 or an external memory 334. The internal memory 332 may, for example, include at least one of a volatile memory (for example, a Dynamic RAM (DRAM), a Static RAM (SRAM), a Synchronous Dynamic RAM (SDRAM), and the like) and a nonvolatile memory (for example, a One Time Programmable ROM (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard drive, a Solid State Drive (SSD), and the like).

The external memory 334 may further include a flash drive, for example, a Compact Flash (CF), a Secure Digital (SD), a Micro Secure Digital (Micro-SD), a Mini Secure Digital (Mini-SD), an extreme Digital (xD), a memory stick, or the like. The external memory 334 may be functionally and/or physically connected to the electronic device 301 through any of various interfaces.

The sensor module 340 may, for example, measure a physical quantity or detect an operating state of the electronic device 301, and may convert the measured or detected information into an electrical signal. The sensor module 340 may include, for example, at least one of, a gesture sensor 340A, a gyro sensor 340B, an atmospheric pressure sensor 340C, a magnetic sensor 340D, an acceleration sensor 340E, a grip sensor 340F, a proximity sensor 340G, a color sensor 340H (for example, a red, green, and blue (RGB) sensor), a biometric sensor 340I, a temperature/humidity sensor 340J, an illumination sensor 340K, and an Ultraviolet (UV) sensor 340M. Additionally or alternatively, the sensor module 240 may, for example, include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 340 may further include a control circuit for controlling one or more sensors included therein. According to an embodiment, the electronic device 301 may further include a processor configured to control the sensor module 340, as a part of the processor 310 or separately from the processor 310, and may control the sensor module 340 while the processor 310 is in a sleep state.

The input device 350 may, for example, include a touch panel 352, a (digital) pen sensor 354, a key 356, or an ultrasonic input device 358. The touch panel 352 may use at least one of, for example, a capacitive type, a resistive type, an infrared type, and an ultrasonic type. Further, the touch panel 352 may further include a control circuit. The touch panel 352 may further include a tactile layer to provide a tactile reaction to a user.

The (digital) pen sensor 354 may be, for example, a part of the touch panel, or may include a separate recognition sheet. The key 356 may include, for example, a physical button, an optical key, or a keypad. The ultrasonic input device 358 may identify data by sensing a sound wave by a microphone (e.g., the microphone 388) in the electronic device 301, through an input tool that generates an ultrasonic signal.

The display 360 (for example, the display 250) may include a panel 362, a hologram device 364, or a projector 366. The panel 362 may include a configuration that is the same as or similar to that of the display 250 of FIG. 2. The panel 362 may be implemented so as to be, for example, flexible, transparent, or wearable. The panel 362 may be configured as one module including the touch panel 352. The hologram device 364 may show a stereoscopic image in the air using light interference. The projector 366 may project light onto a screen to display an image. The screen may be located, for example, inside or outside the electronic device 301. According to an embodiment, the display 360 may further include a control circuit for controlling the panel 362, the hologram device 364, or the projector 366.

The interface 370 may include, for example, a High-Definition Multimedia Interface (HDMI) 372, a Universal Serial Bus (USB) 374, an optical interface 376, or a D-subminiature (D-sub) 378. The interface 370 may be included in, for example, the communication interface 260 illustrated in FIG. 2. Additionally or alternatively, the interface 370 may include, for example, a Mobile High-definition Link (MHL) interface, a Secure Digital (SD) card/Multi-Media Card (MMC) interface, or an Infrared Data Association (IrDA) standard interface.

The audio module 380 may convert, for example, a sound into an electrical signal and vice versa. At least some constituent elements of the audio module 380 may be included in, for example, the input/output interface 240 illustrated in FIG. 2. The audio module 380 may, for example, process sound information that is input or output through the speaker 382, the receiver 384, the earphones 386, the microphone 388, or the like.

The camera module 391 may be, for example, a device that can take a still image or a moving image, and according to an embodiment, may include one or more image sensors (e.g., a front sensor or a rear sensor), a lens, an Image Signal Processor (ISP), or a flash (e.g., an LED or a xenon lamp).

The power management module 395 may, for example, manage power of the electronic device 301. According to an embodiment, the power management module 395 may include a Power Management Integrated Circuit (PMIC), a charger Integrated Circuit (IC), or a battery or fuel gauge. The PMIC may have a wired and/or wireless charging scheme. Examples of the wireless charging scheme may include, for example, a magnetic resonance method, a magnetic induction method, an electromagnetic wave method, and the like. Additional circuits (for example, a coil loop, a resonance circuit, a rectifier, and the like) for wireless charging may be further included. The battery gauge may measure, for example, a remaining charge of the battery 296, and a voltage, a current, or a temperature while charging. The battery 396 may include, for example, a rechargeable battery and/or a solar battery.

The indicator 397 may indicate a specific state of the electronic device 301 or a part thereof (for example, the processor 310), for example, a booting state, a message state, a charging state, or the like. The motor 398 may convert an electrical signal into a mechanical vibration, and may generate a vibration or haptic effect. Although not illustrated, the electronic device 301 may include a processing device (for example, a GPU) for supporting mobile TV. The processing device for supporting mobile TV may process media data according to a standard of, for example, Digital Multimedia Broadcasting (DMB), Digital Video Broadcasting (DVB), media flow or the like.

Each of the aforementioned constituent elements of the electronic device may include one or more components and the name of the corresponding constituent element may vary depending on a type of the electronic device. In various embodiments, the electronic device may include at least one of the above-described constituent elements. Some of the above-described constituent elements may be omitted from the electronic device, or the electronic device may further include additional constituent elements. Further, some of the constituent elements of the electronic device according to the various embodiments may be combined to form a single entity, and thus may equivalently execute functions of the corresponding constituent elements prior to the combination.

Figure 4:
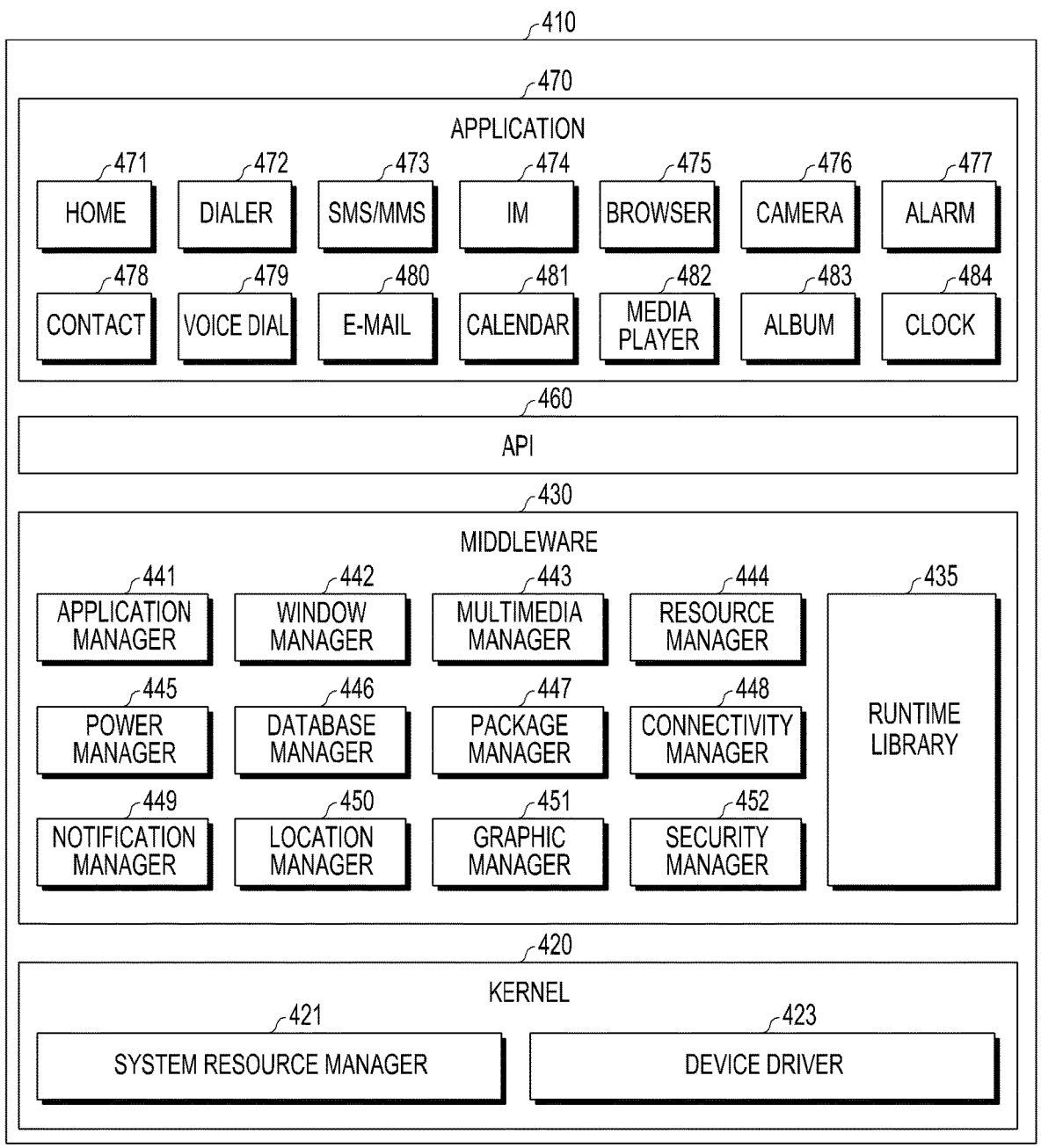
FIG. 4 is a diagram illustrating a block configuration of a program module 410, according to various embodiments.

FIG. 4 is a diagram illustrating a block configuration of a program module 410, according to various embodiments.

According to an embodiment, the program module 410 (e.g., program 270) may include an Operating (operation) System (OS) for controlling a resource relating to an electronic device (e.g., the electronic device 101) and/or various applications (e.g., the applications 271) operating in an operating system. The operating system may be, for example, Android, iOS, Windows, Symbian, Tizen, Bada, or the like.

The program module 410 may include a kernel 420, a middleware 430, an Application Programming Interface (API) 460, and/or applications 470. At least some of the program module 410 may be preloaded in the electronic device, or may be downloaded from a server (for example, the server 106).

The kernel 420 (for example, the kernel 277 of FIG. 2) may include, for example, a system resource manager 421 or a device driver 423. The system resource manager 421 may control, allocate, or collect system resources. According to an embodiment, the system resource manager 421 may include a process management unit, a memory management unit, a file system management unit, and the like. The device driver 423 may include, for example, a display driver, a camera driver, a Bluetooth driver, a shared memory driver, a USB driver, a keypad driver, a Wi-Fi driver, an audio driver, or an Inter-Process Communication (IPC) driver.

For example, the middleware 430 may provide a function required by the applications 470 in common, or may provide various functions to the applications 470 through the API 460 to enable the applications 470 to efficiently use the limited system resources in the electronic device. According to an embodiment, the middleware 430 (e.g., the middleware 275) may include at least one of a runtime library 435, an application manager 441, a window manager 442, a multimedia manager 443, a resource manager 444, a power manager 445, a database manager 446, a package manager 447, a connectivity manager 448, a notification manager 449, a location manager 450, a graphic manager 451, and a security manager 452.

The runtime library 435 may include, for example, a library module used by a complier in order to add a new function through a programming language during the execution of the applications 470. The runtime library 435 may perform input/output management, memory management, or a function for an arithmetic function.

The application manager 441 may manage, for example, a life cycle of at least one of the applications 470. The window manager 442 may manage GUI resources used on a screen. The multimedia manager 443 may detect a format required to reproduce various media files and may encode or decode a media file through a codec appropriate for the corresponding format. The resource manager 444 may manage resources, such as a source code, a memory, a storage space, or the like, of at least one of the applications 470.

The power manager 445 may operate together with, for example, a Basic Input/Output System (BIOS) to manage a battery or power and may provide power information required for the operation of the electronic device. The database manager 446 may generate, search for, or change the database to be used by at least one of the applications 470. The package manager 447 may manage the installation and/or update of an application distributed in the form of a package file.

The connectivity manager 448 may manage, for example, a wireless connection, such as a Wi-Fi or Bluetooth. The notification manager 449 may display or provide a notification of an event, such as a received message, an appointment, and a proximity notification, in such a manner as not to disturb a user. The location manager 450 may manage location information of the electronic device. The graphic manager 451 may manage a graphic effect, which is to be provided to the user, and/or a user interface related to the graphic effect. The security manager 452 may provide all security functions required for system security or user authentication. According to an embodiment, in cases where the electronic device (e.g., the electronic device 101) has a telephone call function, the middleware 430 may further include a telephony manager for managing a voice or video call function of the electronic device.

The middleware 430 may include a middleware module that forms combinations of various functions of the aforementioned constituent elements. The middleware 430 may provide modules specialized according to the type of OS in order to provide differentiated functions. In addition, the middleware 430 may dynamically delete some existing constituent elements, or may add new constituent elements.

The API 460 (e.g., the API 273) may correspond to, for example, a set of API programming functions, and may have different configurations depending on an operating system. For example, one API set for each platform may be provided in the case of Android or iOS, and two or more API sets for each platform may be provided in the case of Tizen.

The applications 470 (e.g., the applications 271) may include at least one application which can provide a function, such as a home 471, a dialer 427, a SMS/MMS 473, an Instant Message (IM) 474, a browser 475, a camera 476, an alarm 477, a contacts 478, a voice dial 479, an email 480, a calendar 481, a media player 482, an album 483, a clock 484, a health care (e.g., measuring of workrate, blood glucose, or the like), or provision of environmental information (e.g., atmospheric pressure information, humidity information, temperature information, or the like).

According to one embodiment, the applications 470 may include an application (hereinafter, referred to as "an information exchange application" for convenience of description) for supporting information exchange between the electronic device (for example, the electronic device 101) and an external electronic device (for example, the electronic device 102 or 104). The information exchange application may include, for example, a notification relay application for transmitting specific information to the external electronic device, or a device management application for managing the external electronic device.

For example, the notification relay application may include a function of transferring, to the external electronic device (for example, the electronic device 102 or 104), notification information generated from other applications of the electronic device (for example, an SMS/MMS application, an e-mail application, a health care application, or an environmental information application). Further, the notification relay application may receive notification information from, for example, the external electronic device and provide the received notification information to the user. The device management application may, for example, manage (for example, install, delete, or update) at least one function (for example, a function of turning on/off the external electronic device itself (or some constituent components thereof) or a function of adjusting the luminance (or, resolution) of a display) of an external electronic device (for example, the electronic device 104) communicating with the electronic device, applications operating in the external electronic device, or services (for example, a telephone call service or a message service) provided by the external electronic device.

According to an embodiment, the application 470 may include an application (e.g., a health care application) designated depending on the attribute (e.g., the attribute of the electronic device, and the type of the electronic device is a mobile medical appliance) of the external electronic device (e.g., electronic device 102 or 104). According to one embodiment, the applications 470 may include an application received from an external electronic device (e.g., the server 106 or the electronic device 102 or 104). According to an embodiment, the applications 470 may include a preloaded application or a third party application that can be downloaded from a server. The names of the constituent elements of the program module 410, according to the embodiment illustrated in the drawing, may vary according to the type of operating system.

According to various embodiments, at least a part of the program module 410 may be implemented in software, firmware, hardware, or a combination of two or more thereof. At least some of the program module 410 may be implemented (for example, executed) by, for example, the processor (for example, the processor 310). At least some of the program module 410 may include, for example, a module, program, routine, sets of commands (instructions), process, or the like for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component or a part thereof. The "module" may be a minimum unit for performing one or more functions or a part thereof. The "module" may be mechanically or electronically implemented. For example, the "module" may include at least one of an Application-Specific Integrated Circuit (ASIC) chip, a Field-Programmable Gate Arrays (FPGA), and a programmable-logic device for performing operations which have been known or are to be developed hereinafter.

At least some of the devices (for example, modules or functions thereof) or the method (for example, operations) according to various embodiments may be implemented by a command stored in a computer-readable storage medium in a program module form. The command, when executed by a processor (e.g., the processor 120), may cause the one or more processors to execute the function corresponding to the command. The computer-readable storage medium may be, for example, the memory 230.

The computer-readable recoding medium may include a hard disk, a floppy disk, a magnetic media (e.g., a magnetic tape), an optical media (e.g., a Compact Disc Read Only Memory (CD-ROM) and a Digital Versatile Disc (DVD)), a magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the embodiment, and vice versa.

The module or the program module according to various embodiments may include one or more of the aforementioned constituent elements or may further include other additional constituent elements, or some of the aforementioned constituent elements may be omitted. Operations executed by a module, a program module, or other constituent elements according to various embodiments may be executed sequentially, in parallel, repeatedly, or in a heuristic manner. Furthermore, some operations may be executed in a different order or may be omitted, or other operations may be added.

The embodiments disclosed herein are provided to describe technical details of the present disclosure and to help the understanding of the present disclosure, and are not intended to limit the scope of the present disclosure. Therefore, it should be construed that all modifications and other various embodiments on the basis of the technical idea of the present disclosure fall within the scope of the present disclosure.

In an embodiment to be described below, an image processing method for compressing an image frame in order to prevent visible loss of an image will be proposed. To this end, an encoder may divide one image frame into data blocks each having a predetermined size, and may obtain block information in order to estimate a minimum error rate for a unit of the data block.

According to various embodiments, the encoder may have a hierarchical structure (hierarchy structure). For example, the hierarchical structure may include an edged layer that compresses edged information obtained from an image to be compressed, a block layer that generates block information, and a scaling layer that compresses scaling information obtained from the image to be compressed.

According to an embodiment, the edged layer and the scaling layer of the encoder may reuse correlation information. For example, the edged layer transfers mode information, block size information, a motion vector, etc., which are applied to compress edged information by the edged layer, to the scaling layer, thereby enabling the scaling layer to reuse the corresponding information. In this case, the scaling layer may not perform a calculation for obtaining mode information, block size information, a motion vector, etc.

Figure 5:
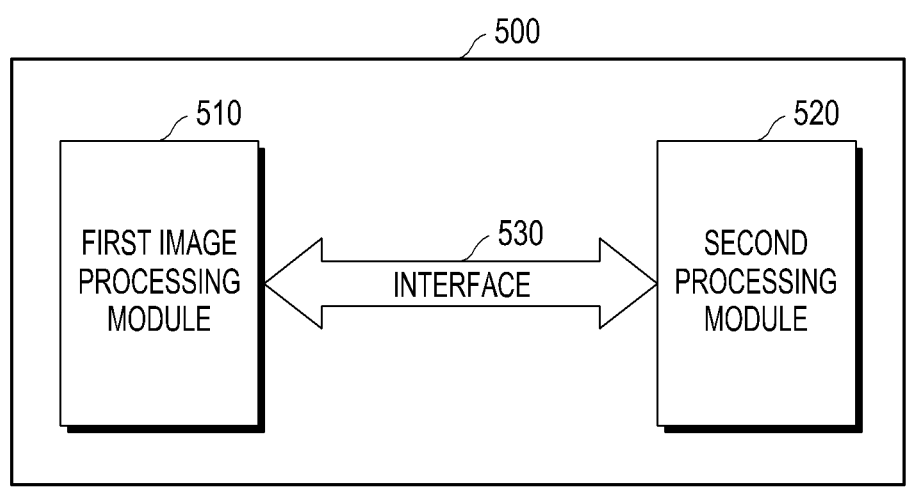
FIG. 5 is a diagram illustrating a configuration of an image processing device, according to various embodiments.

FIG. 5 is a diagram illustrating a configuration of an image processing device, according to various embodiments.

Referring to FIG. 5, an image processing device 500 (e.g., electronic device (101)) may display an image through image processing. According to an embodiment, the image processing device 500 may perform image processing, such as image compression and reconstruction. According to an embodiment, the image processing device 500 may compress an image frame corresponding to a still image or a moving image or may reconstruct the compressed image frame.

The image processing device 500 may record the compressed image frame in a designated recording medium or may transmit the the compressed image frame through a predetermined communication network to an external device. According to an embodiment, the image processing device 500 may reconstruct the compressed image frame recorded in the recording medium or may reconstruct the compressed image frame that is transmitted through the predetermined communication network from the external device.

According to an embodiment, the image processing device 500 is assumed to compress or reconstruct an image frame in the inside of the image processing device. According to an embodiment, the image processing device 500 may include two image processing modules 510 and 520 and an interface 530 that connects the two image processing modules 510 and 520.

According to an embodiment, the second image processing module 520 may receive an image frame from the first image processing module 510 through a predetermined interface 530. An image frame which is provided from the first image processing module 510 to the second image processing module 520 may be compressed or may not be compressed.

According to an embodiment, when the first image processing module 510 includes an encoder, the first image processing module 510 may provide a compressed image frame to the second image processing module 520. In this case, the second image processing module 520 may not include a separate encoder.

According to an embodiment, when the first image processing module 510 does not include an encoder, the first image processing module 510 may provide an image frame which is not compressed, to the second image processing module 520. In this case, the second image processing module 520 may include an encoder in order to compress a received image frame.

For example, when the first image processing module 510 provides a compressed image data to the second image processing module 520, the first image processing module 510 may compress image data by an internal encoder and may transfer the compressed image data to the second image processing module 520 through the interface 530. The second image processing module 520 may store the compressed image data transferred through the interface 530, in a frame buffer, which is a storage region.

According to an embodiment, the second image processing module 520 may reconstruct the compressed image data stored in the frame buffer and may output the reconstructed image data in order to display the data. According to another embodiment, the second image processing module 520 may directly reconstruct the compressed image data and may output the reconstructed image data in order to display the data. In this case, the second image processing module 520 may not include a frame buffer which temporarily stores the compressed image data.

According to an embodiment, when the first image processing module 510 compresses image data and then transmits the compressed image data, the second image processing module 520, even if including an encoder, determines whether image data received from the first image processing module 510 is compressed, and may not use the encoder included in the second image processing module 520.

According to the aforementioned embodiment, when compressed image data is transferred through an interface, the first image processing module 510 may reduce a bandwidth of image data transmitted through the interface 530 used for transferring image data and transmit the image data having the reduced bandwidth.

For example, when the first image processing module 510 provides image data which is not compressed, to the second image processing module 520, the first image processing module 510 may transfer image data which is not compressed, to the second image processing module 520 through an interface 530. The second image processing module 520 may compress the image data transferred through the interface 530, and may store the compressed image data in a frame buffer, which is a storage region.

According to an embodiment, the second image processing module 520 may reconstruct the compressed image data stored in the frame buffer and may output the reconstructed image data in order to display the data. According to another embodiment, the second image processing module 520 may directly reconstruct the compressed image data and may output the reconstructed image data in order to display the data. In this case, the second image processing module 520 may not include a frame buffer for temporarily storing the compressed image data.

According to an embodiment, the first image processing module 510 of FIG. 5 may include an AP and the second image processing module 520 may include a Display Driver IC (DDI) or a Timing CONtroller (T-CON).

For example, in an image processing device, a first image processing module 510 may include an AP and a second image processing module 520 may include a DDI. The AP and the DDI may be components responsible for processing an image to be displayed on a display in a mobile device such as a smartphone.

The AP may provide an image frame which is compressed or not compressed, to the DDI through an interface. A high speed serial interface through which image data is easily transferred may be used as the interface. The high speed serial interface may include a Mobile Industry Processor Interface (MIPI), an Embedded Display Port (eDP), a Serial Peripheral Interface (SPI), etc.

For another example, in an image processing device, a first image processing module 510 may include an AP and a second image processing module 520 may include a T-CON. The AP and the T-CON may be components or modules which are responsible for processing an image to be displayed on a display in a mobile device such as a tablet PC.

The AP may provide an image frame which is compressed or not compressed, to the T-CON through an interface. A high speed serial interface through which image data is easily transferred may be used as the interface. The high speed serial interface may include, for example, a MIPI, an eDP, an SPI, etc.

According to an embodiment, in an image processing device, the second image processing module 520 may include a plurality of T-CONs (T-CON1 and T-CON2). The plurality of T-CONs (T-CON1 and T-CON2) may receive, from a processor, at least one among images (IMG1 and IMG2) and signals (e.g., command, main clock, vertical synchronization signal, etc.), and may generate a control signal for controlling source drivers (SDRV1 and SDRV2) on the basis of the received signals. According to an embodiment, the plurality of T-CONs (T-CON1 and T-CON2) may include an image processing unit and may process the received images (IMG1 and IMG2). According to an embodiment, the image processing unit may be implemented as a separate module different from the plurality of T-CONs (T-CON1 and T-CON2).

According to an embodiment, in an image processing device, a first image processing module 510 may include an AP and a second image processing module 520 may include both a DDI and a T-CON.

Figure 6:
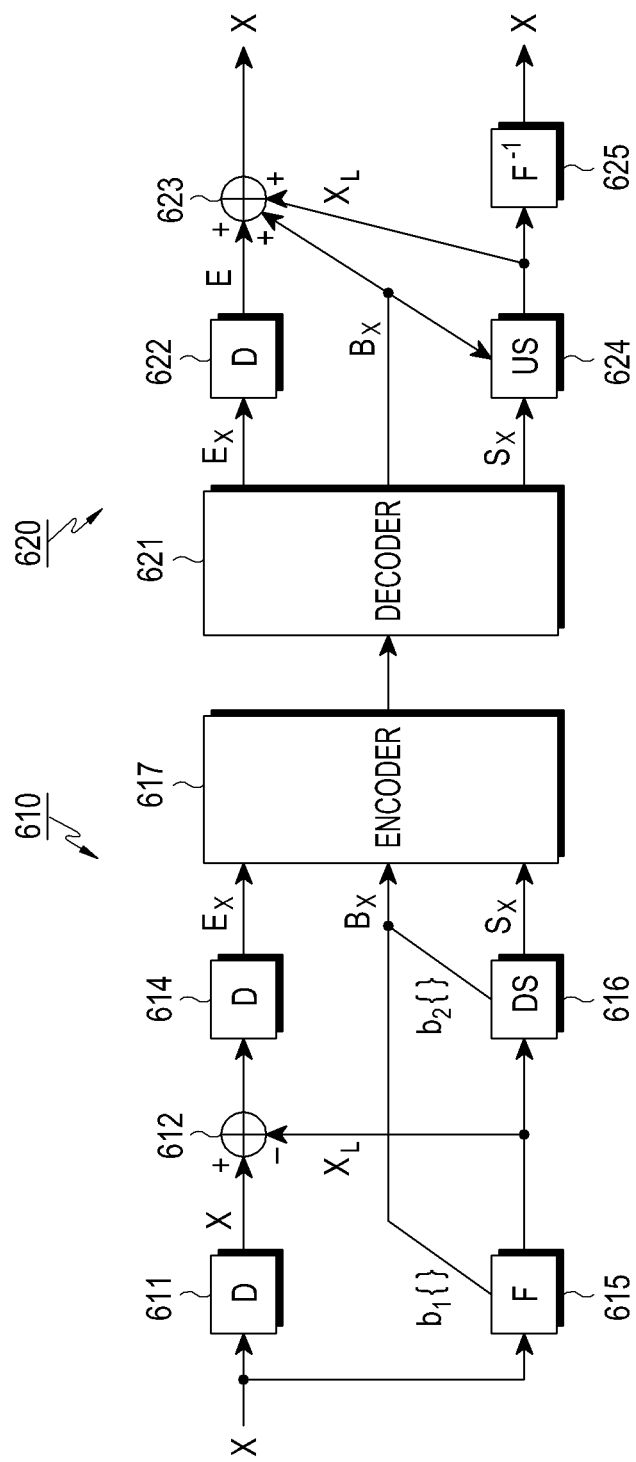
FIG. 6 is a diagram illustrating a configuration according to compression and reconstruction in an image processing device, according to various embodiments.

FIG. 6 is a diagram illustrating a configuration according to compression and reconstruction in an image processing device, according to various embodiments.

Referring to FIG. 6, the image processing device may include at least one of an compression module 610 and a reconstruction module 620. The compression module 610 outputs image data into one compressed bitstream compressed at a predetermined compression rate. The reconstruction module 620 reconstructs the compressed bitstream into original image data.

The compression module 610 includes an edged information generation route, a block information generation route, and a scaling information generation route. The compression module 610 includes an encoder 617 that compresses edged information, block information, and scaling information, which are output through respective routes, into one compressed bitstream.

A first retarder 611, a subtractor 612, and a second retarder 614 are arranged on the edged information generation route. A filter 615 and a down scaler 616 are arranged on the scaling information generation route. The block information generation route is a route that outputs block information generated on the scaling information generation route.

According to an embodiment, image data X to be compressed is provided as an input to an edged information generation route. The first retarder 611 placed on the edged information generation route delays image data X to be compressed, by a predetermined value and outputs the delayed image data. The delayed image data X to be compressed is provided as one input for the subtractor 612. Another input signal to the subtractor 612 may be a signal $X_L$ obtained by filtering the image data X to be compressed, by a predetermined bandwidth. For example, another input signal $X_L$ to the subtractor 612 may be generated on the scaling information generation route.

The subtractor 612 subtracts the image data $X_L$ extracted by the filtering, from the image data X to be compressed, so as to extract edged information E. The extracted edged information E is delayed through the second retarder 614 and is then output as edged information Ex.

According to an embodiment, the image data X to be compressed is also provided as an input to the scaling information generation route. The filter 615 disposed on the scaling information generation route filters the image data X to be compressed by a predetermined bandwidth, and thus extracts the filtered image data $X_L$. The extracted image data $X_L$ is provided to the down scaler 616 disposed on the scaling information generation route and the subtractor 612 disposed on the edged information generation route.

The down scaler 616 down-samples, that is, down-scales the filtered image data $X_L$. The image data which has been down-scaled by the down scaler 616 is output as scaling information $S_X$. For example, down-scaling may reduce the amount of information expressing the image data $X_L$ by lowering resolution on the image data $X_L$. Especially, during down-scaling, information used during a calculation for obtaining edged information may be reused to reduce calculation quantity during scaling.

As one example, a motion vector which can be extracted from edged information may be reused during scaling. However, for an image with no edges therein, motion estimation can be skipped. For example, in image data, most blocks may have a prediction value of 0 even without removal of temporal redundancy. In this case, early mode decision may allow skipping of the motion estimation. Conventionally, when an image is compressed, the quantity of calculation for motion estimation accounts for 60 to 80% of the calculation quantity of an entire code. Therefore, when motion estimation is not performed, the quantity of calculation for the motion estimation can be reduced, so that it is possible to reduce power consumption.

Furthermore, a motion vector estimation error according to brightness information change can be reduced. For example, when an image is compressed, the case in which an incorrect motion vector is obtained may occur due to a change in brightness. However, according to a proposed method, a correct motion vector can be obtained, so that it is possible to reduce a motion vector estimation error according to a brightness change. The reduction of error allows the application of FRC requiring actual motion.

Also, according to a proposed method, a motion vector estimation error can be reduced when there is no reference image, for example, in a motion vector falling outside of a search range and during a scene change.

Information $b_1\{\ \}$ considered for filtering on the scaling information generation route and information $b_2\{\ \}$ considered for down-scaling may be output as block information $B_X$ through the block information generation route.

Edged information Ex output through the edged information generation route, block information $B_X$ output through the block information generation route, and scaling information $S_X$ output through the scaling information generation route may be input to the encoder 617.

The encoder 617 may perform compression according to the edged information Ex, the block information $B_X$, and the scaling information $S_X$, and may generate one compressed bitstream through the compression. The compressed bitstream generated by the encoder 617 may be recorded in a designated recording medium or may be transferred to another device through a designated communication channel.

The compression module 610 included in the image processing device, as described above, may have a three-stage hierarchical structure. The hierarchical structure may include an edged layer corresponding to the edged information generation route, a block layer corresponding to the block information generation route, and a scaling layer corresponding to the scaling information generation route.

According to an embodiment, the edged layer may perform compression on the edged information extracted from image data. The edged layer may transfer, to the scaling layer, mode information and block size information which are used in relation to the edged information during the compression. The scaling layer may perform compression on the scaling information by using the mode information and the block size information, which are transferred from the edged layer.

The reuse of the correlation information between the edged layer and the scaling layer prevents duplicated calculation by the edged layer and the scaling layer. Furthermore, the reuse of the correlation information reduces the information amount of the edged information and increases the information amount of the scaling information, and thus can increase the entire compression rate without increasing the entire information amount. That is, a high quality scalable image can be provided without a great increase in the entire information amount due to compression.

According to an embodiment, in the scaling layer compressing the scaling information, information on an image of a block unit may be used when the block layer generates block information. For example, the block layer may apply the block information to a compression tool. For example, the block information may be information on the brightness, structure (texture), complexity, etc. of an image to be compressed. In this case, the block layer may perform processing of weighted prediction, I-frame cycle configuration, transmission rate control, etc. by using the block information.

Desirably, correlation information between an edged signal and a scaling signal may be reused during generation of the edged information and the scaling information. The reuse of the correlation information can prevent duplicated calculation during compression of image data and can reduce the calculation quantity according to the compression in the image processing device. For example, an edged shape included in an image to be compressed may be used in early mode decision relating to a block size, a compression method (intra, inter, skip, etc.), etc. Also, motion vector information extracted during obtaining of edged information from image data may be used during scaling of an image to be compressed.

Furthermore, a high quality scalable image can be provided by using down-scaling of edged information and up-scaling of scaling information. That is, it is possible to extract a high quality still image.

Also, according to a proposed method, the block information is applied to a compression tool, so that weighted prediction, I-frame cycle configuration, transmission rate control, etc. can be processed by using the block information The reconstruction module 620 may include a first reconstruction route of reconstructing image data on the basis of the edged information and a second reconstruction route of reconstructing image data on the basis of scaling information. A decoder 621 included in the reconstruction module 620 may obtain edged information Ex, block information $B_X$, and scaling information $S_X$ from a compressed bitstream, and may transfer the pieces of obtained information to the first reconstruction route or the second reconstruction route. For example, the edged information Ex may be transferred as an input to the first reconstruction route and the scaling information $S_X$ may be transferred as an input to the second reconstruction route. The block information $B_X$ may be provided to a random configuration disposed along the first reconstruction route or the second reconstruction route, such that the block information $B_X$ can be used to obtain image data X from the edged information Ex and the scaling information $S_X$.

A retarder 622 disposed on the first reconstruction route may delay the edged information Ex transferred from the decoder 621, by a predetermined value and thus outputs the delayed edged information. The delayed edged information E may be provided as a first input of an adder 623. A second input of the adder 623 may be block information $B_X$ transferred from the decoder 621. A third input of the adder 623 may be a scaling signal $X_L$ obtained by up-scaling the scaling information $S_X$ transferred from the decoder 621.

The adder 623 may output image data X by adding the edged information E corresponding to the first input, the block information $B_X$ corresponding to the second input, and the scaling signal $X_L$ corresponding to the third input.

Also, the scaling signal $X_L$, obtained by up-scaling, may be provided as an input to an inverse filter 625 disposed on the second reconstruction route. The inverse filter 625 may perform inverse-filtering of the scaling signal $X_L$ using a predetermined bandwidth, and may output image data X resulting from the inverse-filtering.

Figure 7:
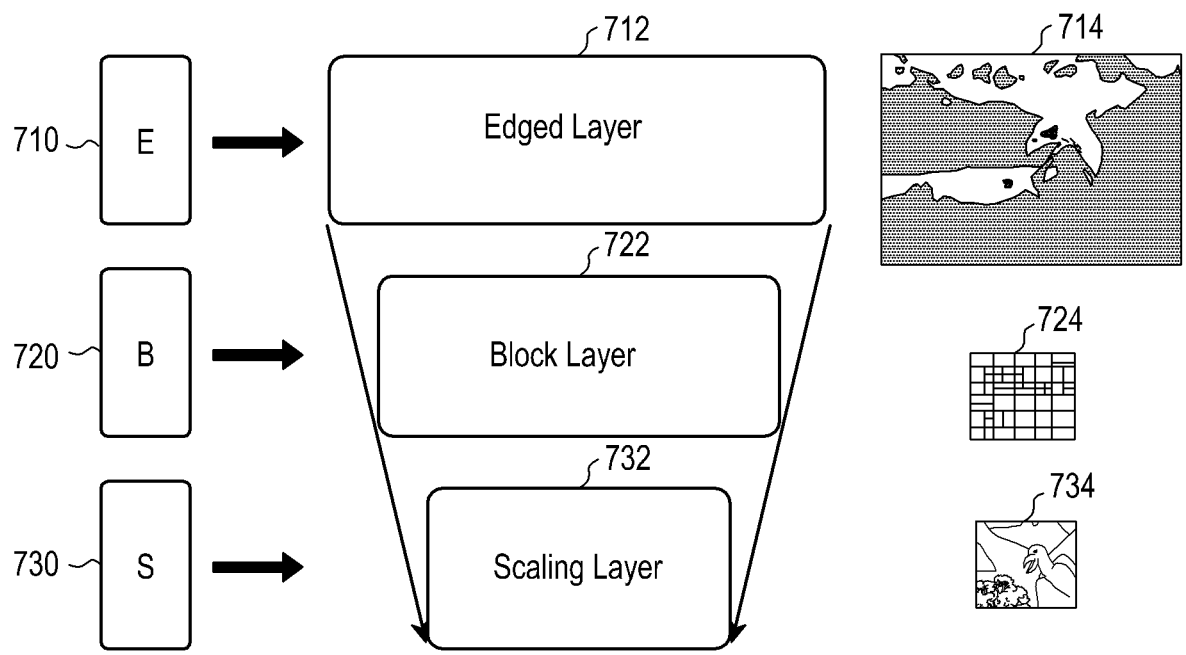
FIG. 7 is a diagram illustrating a hierarchical structure during compression, according to various proposed embodiments.

FIG. 7 is a diagram illustrating a hierarchical structure during compression, according to various proposed embodiments.

Referring to FIG. 7, a hierarchical structure for compression may include an edged layer 712, a block layer 722, and a scaling layer 732. The edged layer 712 may obtain edged information 710 from image data to be compressed. Reference numeral 714 shows an example of the edged information 710. The block layer 722 may obtain block information 720 corresponding to image data to be compressed. Reference numeral 724 shows an example of the block information 720. The scaling layer 732 may obtain scaling information 730 from image data to be compressed. Reference numeral 734 shows an example of the scaling information 730.

According to an embodiment, the edged layer 712 may transfer, to the scaling layer 732, mode information, block size information, etc. which are used in compression of edged information, such that the mode information, the block size information, etc. can be reused while obtaining of the scaling information. Also, the edged layer 712 may transfer motion vector information, extracted from an edge included in image data, to the scaling layer 732.

The scaling layer 732 may perform compression on scaling information by using the mode information, the block size information, etc. provided from the edged layer 712. The scaling layer 732 may transfer, to the block layer 722, image information of a block unit, which is obtained by performing compression on scaling information.

The block layer 722 may construct block information by using image information of a block unit, transferred from the scaling layer 732. For example, the image information of a block unit may include the brightness, the texture, the complexity, and the like of an image.

Figure 8:
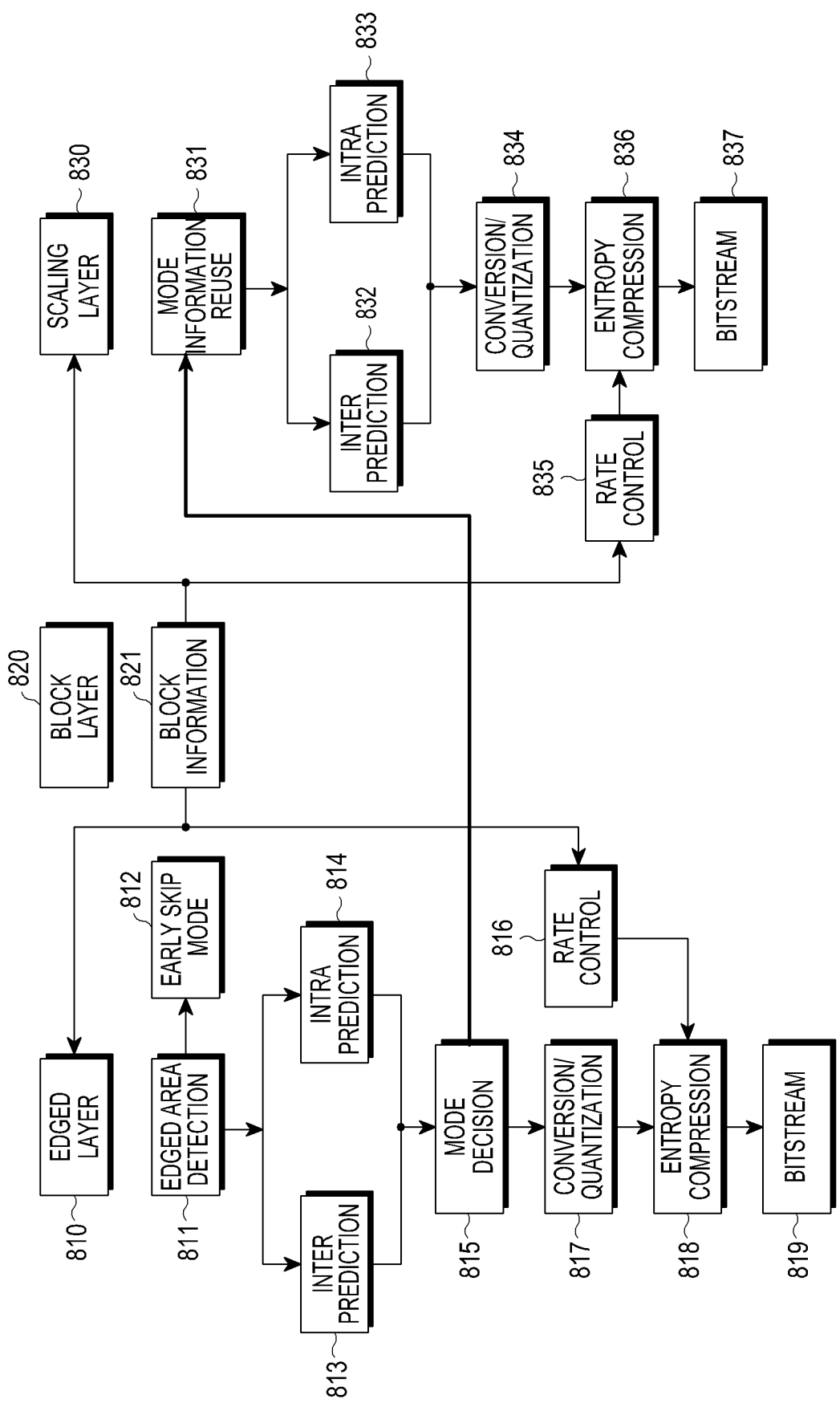
FIG. 8 is a diagram illustrating a compression procedure performed by a compression module having a hierarchical structure in an image processing device, according to various embodiments.

FIG. 8 is a diagram illustrating a compression procedure performed by a compression module having a hierarchical structure in an image processing device, according to various embodiments.

Referring to FIG. 8, the edged layer 810 may detect an edged region from an image to be compressed, in operation 811. When an edged region is not detected in the image to be compressed, the edged layer 810 does not perform motion estimation through early mode decision, in operation 812. In the same way, the mode of not performing motion estimation is referred to as an "early skip mode". When image data is compressed by the early skip mode, the quantity of calculation for compression can be reduced.

When an edged region is detected from the image to be compressed, the edged layer 810 may perform inter prediction on the image to be compressed, in operation 813, and may perform intra prediction on the image to be compressed, in operation 814. The edged layer 810 may determine a compression mode for compressing the image to be compressed, on the basis of a result according to the inter prediction and a result according to the intra prediction, in operation 815. The edged layer 810 may transfer information about the determined compression mode to the scaling layer 830.

The edged layer 810 may perform conversion and quantization on the image to be compressed, in operation 817. The edged layer 810 may determine a compression rate for compressing the image through controlling of a compression rate on the basis of the block information provided from the block layer 820, in operation 816. The edged layer 810 may perform entropy compression on the image which has been converted and quantized, in operation 818. The edged layer 810 may consider a previously determined compression rate in order to perform entropy compression. The edged layer 810 may output a bitstream corresponding to the edged information compressed through entropy compression (operation 819).

The block layer 820 may generate block information on the basis of pieces of information which are considered during compression of edged information and during compression of scaling information (operation 821). The block layer 820 may provide the block information to the edged layer 810 and the scaling layer 830 such that the block information is referred to during determination of a compression rate on the edged information and a compression rate on the scaling information.

The scaling layer 830 may determine a compression mode for compressing scaling information, in operation 831. The compression mode for compressing scaling information may reuse information on a compression mode provided from the edged layer 810.

The scaling layer 830 may perform inter prediction on the image to be compressed, in operation 832, and may perform intra prediction on the image to be compressed, in operation 833. The scaling layer 830 may perform conversion and quantization on the image to be compressed, on the basis of a result according to the inter prediction and a result according to the intra prediction, in operation 834. The scaling layer 830 may determine a compression rate for compressing the image through controlling of a compression rate on the basis of the block information provided from the block layer 820, in operation 835. The scaling layer 830 may perform entropy compression on the image which has been converted and quantized, in operation 836. The scaling layer 830 may consider a previously determined compression rate in order to perform entropy compression. The scaling layer 830 may output a bitstream corresponding to the scaling information compressed through entropy compression (operation 837).

According to the above description, the edged layer 810 may determine whether to apply an early skip mode or a compression mode depending on whether an edge exists in the image to be compressed. In this case, when an image to be compressed does not include an edge, motion estimation is skipped, so that the quantity of calculation for the motion estimation can be reduced.

Furthermore, the block layer 820 may provide the block information to the edged layer 810 and the scaling layer 830. In this case, the edged layer 810 may control a compression rate for compressing edged information, by using the block information provided by the block layer 820, and the scaling layer 830 may control a compression rate for compressing scaling information by using the block information provided by the block layer 820.

Figure 9:
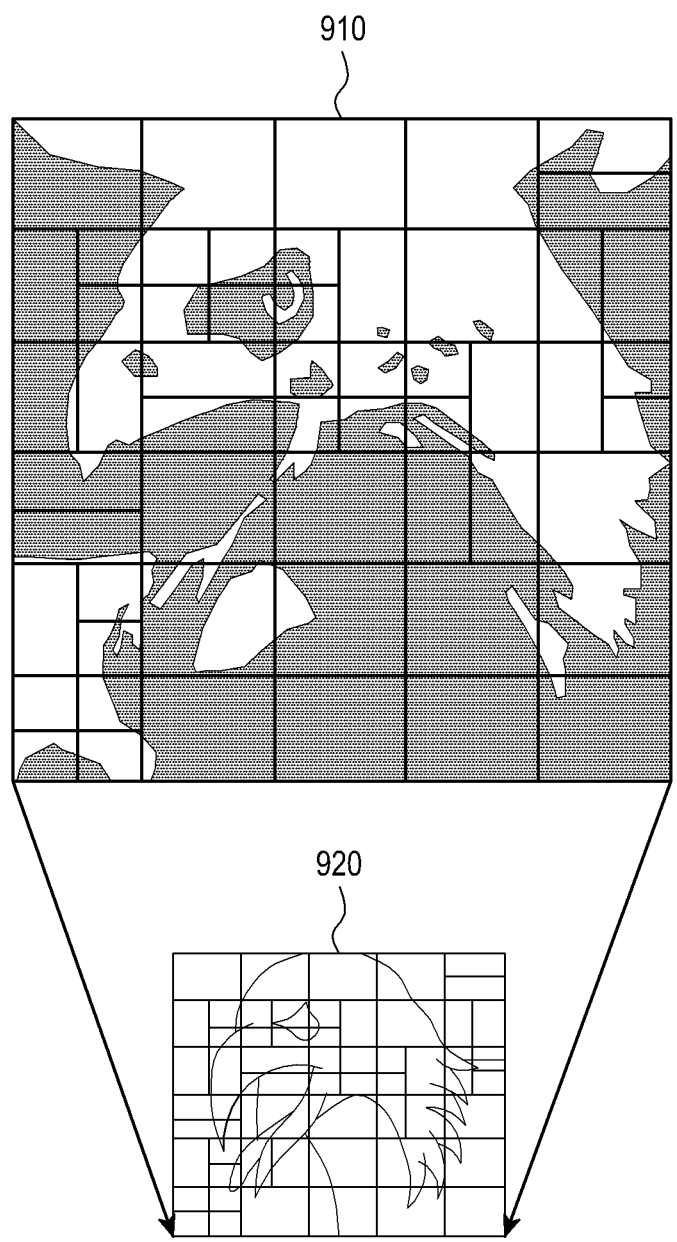
FIG. 9 is a diagram illustrating an example in which a compression module of an image processing device selects an optimum compression mode, according to various embodiments.

FIG. 9 is a diagram illustrating an example in which a compression module of an image processing device selects an optimum compression mode, according to various embodiments.

Referring to FIG. 9, the compression module may determine an optimum compression mode through simplified mode decision by using block division information for dividing an image to be compressed. In this case, the selection of the optimum compression mode may be performed easily and quickly.

Reference numeral 910 shows an example where an edged image, obtained from an image to be compressed, is divided by using a predetermined block division information. Reference numeral 920 shows an example where a scaling image is compressed by using a compression mode selected on the basis of the divided edged image.

Figure 10A:
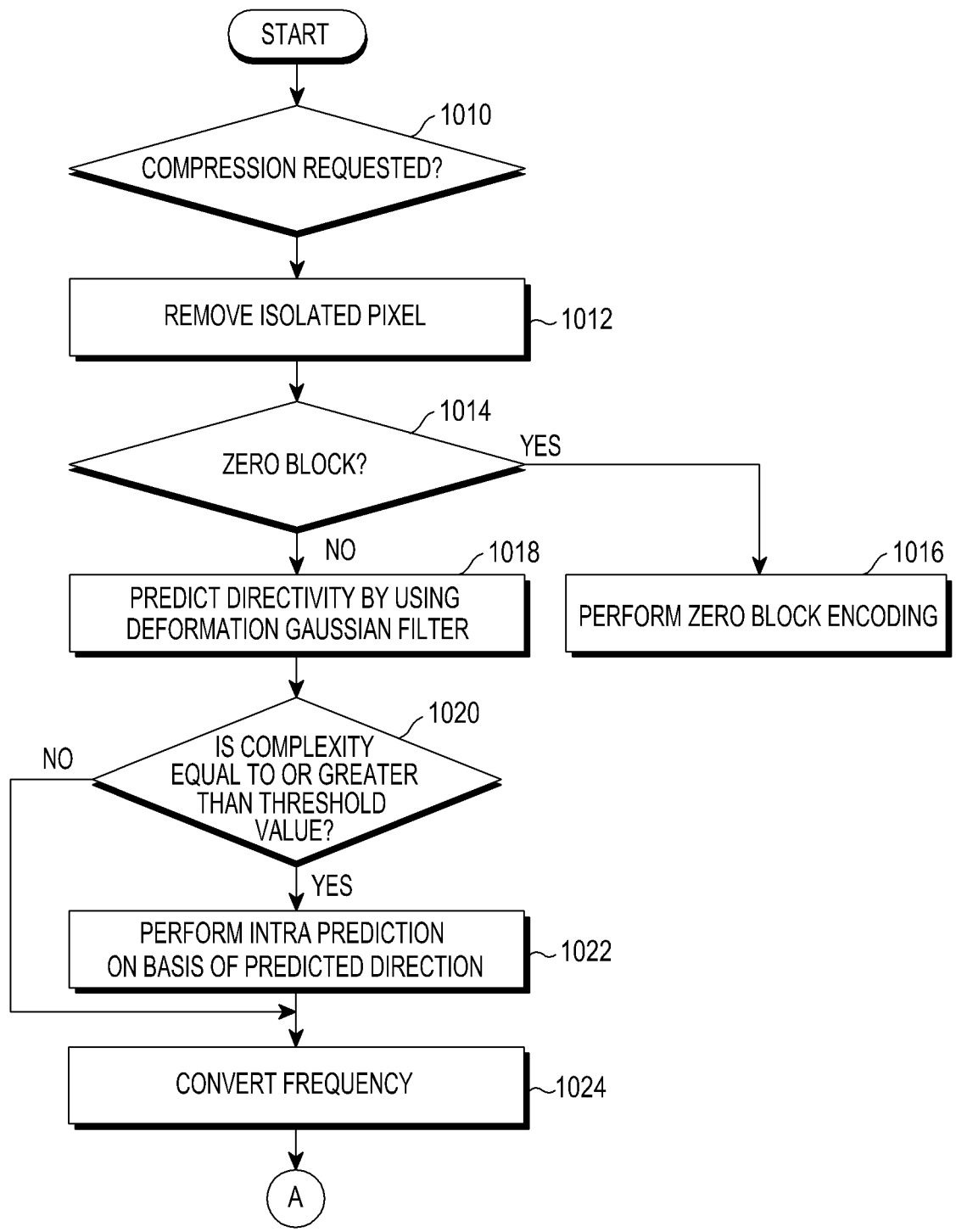
FIGS. 10A and 10B are diagrams illustrating a control flow according to a compression operation of an image processing device, according to various embodiments.
Figure 10B:
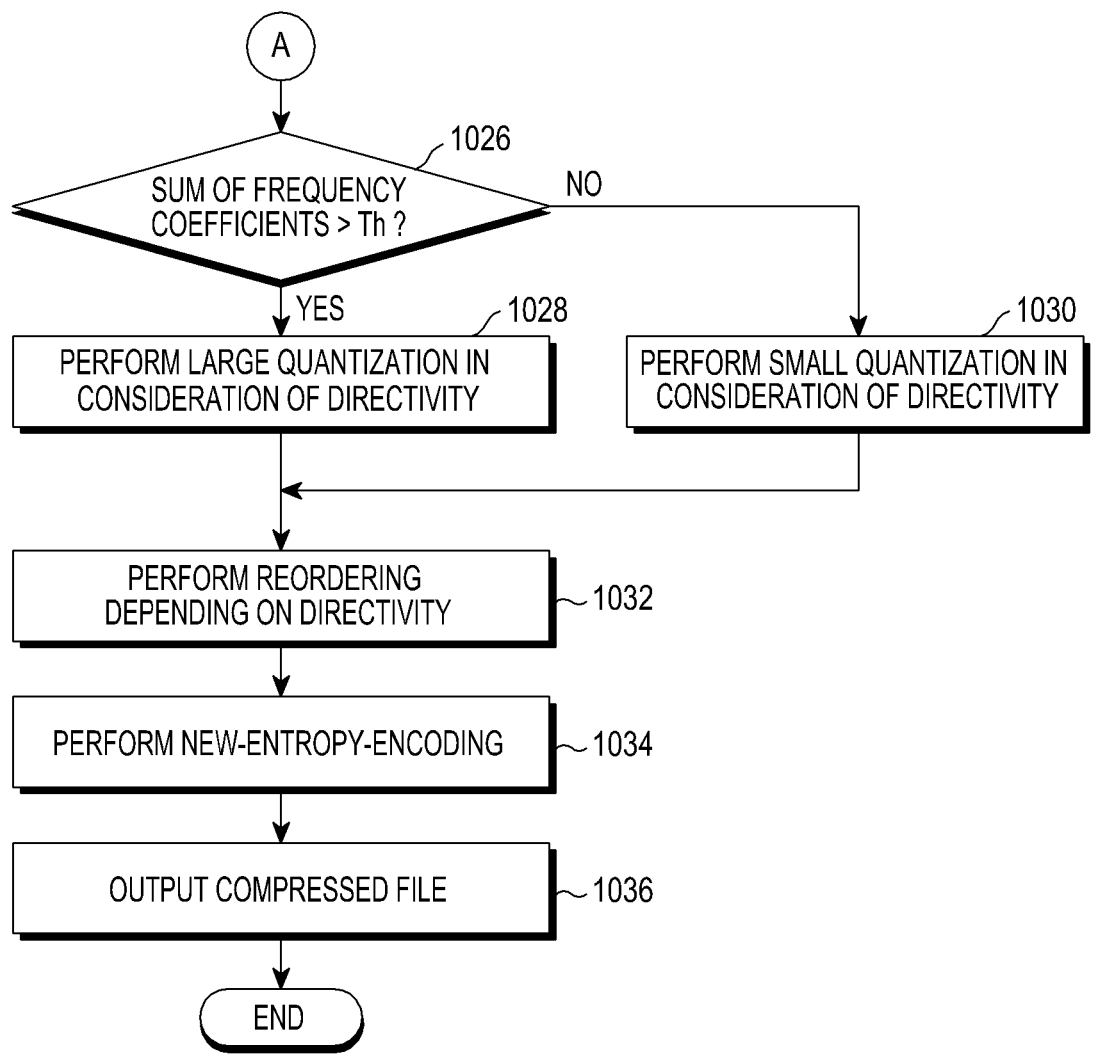

FIGS. 10A and 10B are diagrams illustrating a control flow according to a compression operation of an image processing device, according to various embodiments. FIGS. 10A and 10B are illustrated on the assumption that one frame is subject to be compressed. In the case of compressing multiple frames, the compression may be performed by repeating the control flows illustrated in FIGS. 10A and 10B. Furthermore, in the proposed compressing operation, a pixel set having a predetermined size, instead of a frame, may be compressed as a compression subject. For example, the pixel set may be smaller or greater than a size of one frame. However, the pixel set may be preferred to be determined as a small unit dividing one frame. Hereinafter, the term of subject block will be used to explain a compression unit, for convenience of explanation.

Referring to FIGS. 10A and 10B, an image processing device monitors whether a compression request is generated (operation 1010). When a compression request is generated, the image processing device removes an isolated pixel among pixels included in one subject block which is subject to be compressed (operation 1012). The isolated pixel may mean a minority of pixels, each having a value different from surrounding values. For example, when all the surrounding pixels of a particular pixel having a value of "1" have a value of "0", the particular pixel may be removed. The operation of removing the particular pixel may include an operation of changing the value of "1" included in the particular pixel to "0". An operation of removing the isolated pixel may increase the number of occurrences of zero blocks. The zero block means a block in which all pixels constituting the block have a value of "0". A compression rate realized by the image processing device may increase in proportion to the number of occurrences of zero blocks.

Table 1 below shows an example of change in the number of zero blocks caused by removal of an isolated pixel.

TABLE 1

| Division | 16 * 16 | 8 * 8 | 4 * 4 |
|---|---|---|---|
| Before removing isolated pixel | 3632 | 4114 | 5305 |
| After removing isolated pixel | 3712 | 4432 | 6044 |

In table 1 above, it is assumed that an image has a size of 640*480, and that a unit thereof is a block number of 4*4.

After removing an isolated pixel, the image processing device determines whether the subject block is a zero block (operation 1014). For example, the image processing device may determine whether the subject block is a zero block, by identifying whether a coefficient exists in the subject block. The coefficient may be a value different from "0".

When determining that the subject block is a zero block, the image processing device may perform encoding on the subject block (operation 1016). The image processing device may perform zero block encoding (coding) on the subject block. For example, the zero block encoding may be performed by substituting, for a zero block, a predetermined number of bits having a predetermined value. The number of bits to be substituted by the zero block encoding should be relatively smaller than the number of encoding bits generated by general block encoding. The small number of the encoding bits implies a high compression rate.

When determining that the subject block is not a zero block, the image processing device may predict the directivity on the subject block by using a deformation Gaussian filter (operation 1018). The image processing device determines whether the complexity of the subject block is a threshold value or more, on the basis of a result according to the prediction of directivity (operation 1020). The complexity of the subject block may be predicted on the basis of pixel values distributed in the subject block by various methods. The distribution of pixel values in the subject block may be identified by region detection through dispersion, region detection through coupling, etc.

According to an embodiment, the region detection through dispersion may allow discrimination between a complex region and a monotonous region in the subject block by using dispersion. However, when the complex region and the monotonous region have the same dispersion value, the region detection by dispersion proposed above may not be a correct solution for discriminating between regions.

According to an embodiment, the region detection through coupling may allow discrimination between regions in the subject block by using correlation between adjacent pixels. The adjacent cells may be used as meanings indicating all the pixels adjacent in up/down, left/right, and diagonal directions.

For example, depending on whether the adjacent pixels have the same value, a correlation value between the adjacent pixels may be assigned. A correlation value (e.g., "2") between adjacent cells having an identical value in up/down and left/right (vertical and horizontal) directions and a correlation value (e.g., "1") between adjacent cells having an identical value in a diagonal direction may be different.

When a correlation value is assigned between all the adjacent cells included in the subject block, a sum of the all correlation values assigned in the subject block may be calculated. The calculated sum may be used as a variance (monotonousness) value. The variance value may express an amount of monotonousness in the subject block. That is, the variance value may increase in proportion to the amount of monotonousness of the subject block. In other words, the large variance value may be understood to mean that the subject block is monotonous, and the small variance value may be understood to mean that the subject block is complex.

Figure 11:
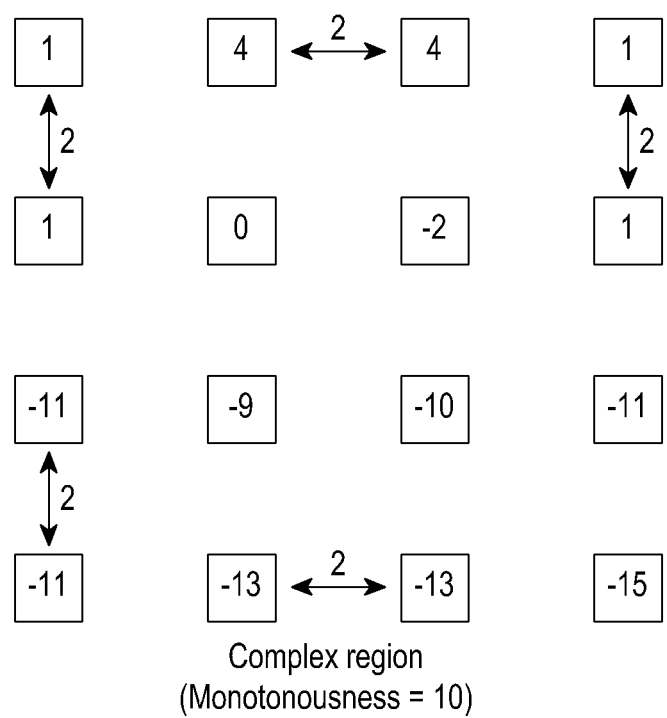
FIGS. 11 and 12 are diagrams illustrating examples of complex information calculated on one subject block, according to various proposed embodiments.
Figure 12:
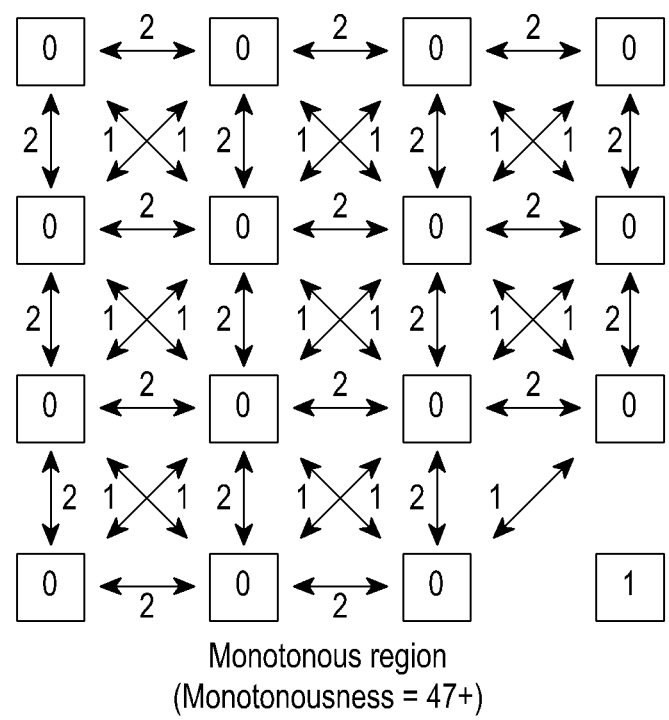

FIGS. 11 and 12 are diagrams illustrating examples of complex information calculated on one subject block, according to various proposed embodiments.

It is noted that the variance value "10" calculated by the pixel values of the subject block illustrated in FIG. 11, is smaller than the variance value "47" calculated by the pixel values of the subject block illustrated in FIG. 12. As a result, it is noted that the complexity of the subject block illustrated in FIG. 11 is relatively higher than that of the subject block illustrated in FIG. 12. That is, it can be determined that an image expressed by the subject block illustrated in FIG. 11 belongs to a complex region, and an image expressed by the subject block illustrated in FIG. 12 belongs to a monotonous region.

When it is determined that the complexity of the subject block is a threshold value or more, the image processing device may perform intra prediction on the basis of a direction predicted with reference to the subject block (operation 1022).

When it is not determined that the complexity of the subject block is a threshold value or more, or when the intra prediction has been completed, the image processing device may finish image processing in a spatial domain and may then perform image processing in a frequency domain.

The image processing device may perform frequency conversion on the subject block in order to perform image processing in the frequency domain (operation 1024). The image processing device determines whether a sum of frequency coefficients in the subject block in which the frequency conversion has been performed is a predetermined threshold value (Th) or more (operation 1026).

When the sum of frequency coefficients is greater than the predetermined threshold value, the image processing device performs large quantization on the subject block in consideration of directivity in the frequency domain (operation 1028). When the sum of frequency coefficients is not greater than the predetermined threshold value, the image processing device performs small quantization on the subject block in consideration of directivity in the frequency domain (operation 1030).

When quantization by one of the large quantization or the small quantization is completed, the image processing device reorders image bits of the subject block that has been quantized (operation 1032). The image processing device performs new-entropy-encoding (entropy coding) on the reordered image bits, and outputs a compressed file generated therethrough (operations 1034 and 1036).

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the aforementioned embodiments, but should be defined by the appended claims and equivalents thereof.

What is claimed is:

1. A device comprising:
a communication interface; and
at least one processor,
wherein the at least one processor is configured to:
obtain image data;
obtain edged information from the image data;
compress the edged information using information on at least one of a mode related to a compression method, a size of a block, or a motion vector;
obtain scaling information from the image data;
compress the scaling information using at least one of the mode, the size of the block, or the motion vector;
obtain block information, based on data obtained while the scaling information is obtained; and
compress the block information.

2. The device of claim 1, wherein the at least one processor is configured to obtain the edged information by subtracting, from the image data, data obtained by filtering the image data through a filter.

3. The device of claim 1, wherein the block information includes at least one of a brightness, a texture, or a complexity of the image data.

4. The device of claim 2, wherein the at least one processor is configured to obtain the scaling information by down-scaling the data obtained by filtering the image data through the filter.

5. The device of claim 1, wherein the at least one processor is configured to transmit, to an external device, the compressed edged information, the compressed scaling information, and the block information, through the communication interface.

6. The device of claim 1, wherein the at least one processor is further configured to:
receive encoding information through the communication interface; and
obtain the edged information, the scaling information, and the block information from the encoding information.

7. The device of claim 6, wherein the at least one processor is further configured to obtain the image data by performing an up-scaling related to the scaling information by using the block information.

8. A method for processing an image in a device, the method comprising:
obtaining image data;
obtaining edged information from the image data;
compressing the edged information using information on at least one of a mode related to a compression method, a size of a block, or a motion vector;
obtaining scaling information from the image data;
compressing the scaling information using the at least one of the mode, the size of the block, or the motion vector;
obtaining block information, based on data obtained while the scaling information is obtained; and
compressing the block information.

9. The method of claim 8, wherein obtaining the edged information comprises obtaining the edged information by subtracting, from the image data, data obtained by filtering the image data through a filter.

10. The method of claim 8, wherein the block information includes at least one of a brightness, a texture, or a complexity of the image data.

11. The method of claim 9, wherein obtaining the scaling information comprises:
obtaining the scaling information by down-scaling the data obtained by filtering the image data through the filter.

12. The method of claim 11, further comprising transmitting, to an external device, the compressed edged information, the compressed scaling information, and the block information, through a communication interface of the device.

13. The method of claim 8, further comprising:
receiving encoding information through a communication interface of the device; and
obtaining the edged information, the scaling information, and the block information from the encoding information.

14. The method of claim 8, further comprising:
obtaining the image data by performing an up-scaling related to the scaling information by using the block information.

* * * * *